United States Patent

[11] 3,578,086

| [72] | Inventor | Kenneth M. Giles |
| | | Chesterville, Ontario, Canada |
| [21] | Appl. No. | 772,978 |
| [22] | Filed | Nov. 4, 1968 |
| [45] | Patented | May 11, 1971 |
| [32] | Priority | Nov. 2, 1967 |
| [33] | | Canada |
| [31] | | 004,099 |

[54] RUBBER HORSESHOE
12 Claims, 4 Drawing Figs.
[52] U.S. Cl. ................................................ 168/18
[51] Int. Cl. ................................................ A01l 3/00
[50] Field of Search ....................................... 168/11-
—22, 24, 26, 28; 168/17, 18, 1, 4

[56] References Cited
UNITED STATES PATENTS
124,215  3/1872  Moran et al. ................. 168/18

730,483   6/1903  Schwartz .................... 168/19
1,298,364 3/1919  McCoy ....................... 168/18

FOREIGN PATENTS
17,584   7/1894  Great Britain
196,870  5/1923  Great Britain

*Primary Examiner*—Hugh R. Chamblee
*Attorney*—Cushman, Darby & Cushman

ABSTRACT: A reuseable unitary horseshoe formed from a hard resilient natural or synthetic resinous material which may be readily fitted to and removed from a horse's hoof, said shoe having a lip extending from its outer edge shaped to accommodate the lower part of the hoof and being provided with means adapted to releasably reduce the distance between the free ends of the shoe against the natural resilience of the shoe whereby to adjust the shape of the shoe for fitting to the horse's hoof.

RUBBER HORSESHOE

The present invention relates to a reusable unitary horseshoe which may be readily fitted on and removed from a horse's hoof and in particular, is directed to such a horseshoe formed from a hard resilient natural of synthetic resinous material and in particular, hard rubber.

With conventional steel horseshoes, these are permanently fixed to the horse's hoof by means of horseshoe nails which firstly requires the services of a blacksmith in order to fit the shoes to the horse and further, due to the permanency of the steel horseshoe on the horse's foot, tends to retard the growth and spread of the horse's foot causing much of the disease found in the feet of a horse such as contraction of the foot, corns and nail pricks. Further with the permanent steel horseshoe, there is a tendency on the part of the owner to neglect the horse's feet which also leads to diseases of the horse's foot.

The present invention provides a horseshoe which is not permanently attached to the horse's foot and may be readily slipped onto the horse's foot and snugly fitted thereon very simply and easily and also readily removed from the horse's foot when it is desired. As a result of this, the horse's foot, being for the most part without the presence of a horseshoe, will grow and spread easily and will thus avoid much of the diseased feet normally found in the horses having steel horseshoes fitted on their feet as referred to above. Further, as it is generally necessary in order to be able to fit the horseshoe of the present invention to the horse's foot, there is always a necessity to keep the foot approximately of the same size as the shoe to be fitted to the foot and thus neglect of the foot will be to a great extent reduced and constant application of the blacksmith rasp and knife will ensue.

According to the present invention therefore, there is provided a reuseable unitary horseshoe which may be readily fitted to and removed from a horse's hoof which shoe is formed from a hard resilient natural or synthetic resinous material, has a lip extending from its outer edge shaped to accommodate the lower part of the hoof and is provided with means adapted to releaseably reduce the distance between the free ends of the shoe against the natural resilience of the shoe whereby to adjust the shape of the shoe for fitting to the horse's hoof.

In a preferred embodiment of the present invention, the means for releaseably reducing the distance between the free ends of the shoe against the natural resilience thereof is located on the inner edge of the shoe and desirably comprises means defining a selected path and the inner edge of said shoe and a cord arranged to pass around said selected path; said cord being anchored at each end and the adjustment means being adapted to releaseably shorten the length of the wire.

In accordance with a more preferred embodiment of the invention in order to adjust the shape of the shoe for fitting to the horse's hoof and also to allow for subsequent removal of the shoe from the horse's hoof or release of the adjusting means, the inner edge of the shoe is provided with a plurality of spaced eyelets through which a wire such as a heavy leader wire, passes the wire being anchored at each end to the inner edge of the shoe and adjustment means being provided, anchored to the inner edge of the shoe and adapted to releaseably shorten the length of the wire. Suitably, the adjustment means comprises an adjustment screw anchored to the inner edge of the shoe there desirably being an adjustment screw on each end of the wire. In order to provide for the comfort of the horse's feet, the adjustment screws and the eyelets may be covered by the material forming the horseshoe.

In an alternative embodiment of the present invention the means for releaseably reducing the distance between the free ends of the shoe against the natural resilience thereof comprises a pair of eyelets each connected e.g. attached to a free end of the shoe and adjustable strap means passing through said eyelets and adapted to releasably shorten the distance between said eyelets. Suitably the eyelets are also attached to the lip of said shoe.

In order to shape the lip to accommodate the lower part of the horse's hoof, it is suitably arranged to extend at an acute angle to the outer edge of the horseshoe and has its greatest width at the front of the shoe which is suitably 1 inch in width and tapers along both sides of the shoe so as to have its narrowest width at the back of the shoe where it is suitably approximately five-eighths inches in width. For added strength, there are suitably provided within the lip of the shoe and securely attached to the shoe a plurality of clips, suitably three clips of a metal, one at the front and at each side of the shoe.

The shoe is suitably made of a natural or synthetic resinous material which, for the purposes of adjustment, must be resilient and for the purposes of wear and support for the horse's hoof, must be hard. A preferred material in this direction is hard rubber. However, it will be readily realized that any other similar material may be used.

If it is necessary, the bottom surface of the shoe which makes contact with the ground may be provided with a plurality of pieces of metal conventionally referred to as grabs inserted therein which act to give the horse traction and prevent slipping. Further, for horses that need their shoes weighted, a piece of lead may be inserted anywhere in the shoe, for example trotting horses that require toe weights may have a piece of lead of the desired weight inserted in the toe of the shoe and if desired extending over the lip.

In a still further preferred embodiment of the present invention, there is provided in combination with the aforesaid shoe, a boot also formed from a natural or synthetic resinous material and in particular, rubber which is adapted to fit around the pastern of the horse's leg and extend down to the cornet and fasten at the heel of the foot. Fastened to this boot is a strong elastic natural or synthetic resinous sheet material suitably rubber which covers the remainder of the hoof. The sheet will be attached to the upper edge of the lip of the horseshoe and the lower edge of the boot. It will be readily appreciated that the elastic sheet should have enough strength so that it will be under tension at all times and keep the shoe in place and will also have enough stretch to expand as the hoof of the horse grows.

The present invention will be further illustrated by way of the accompanying drawings in which.

Figure 1:
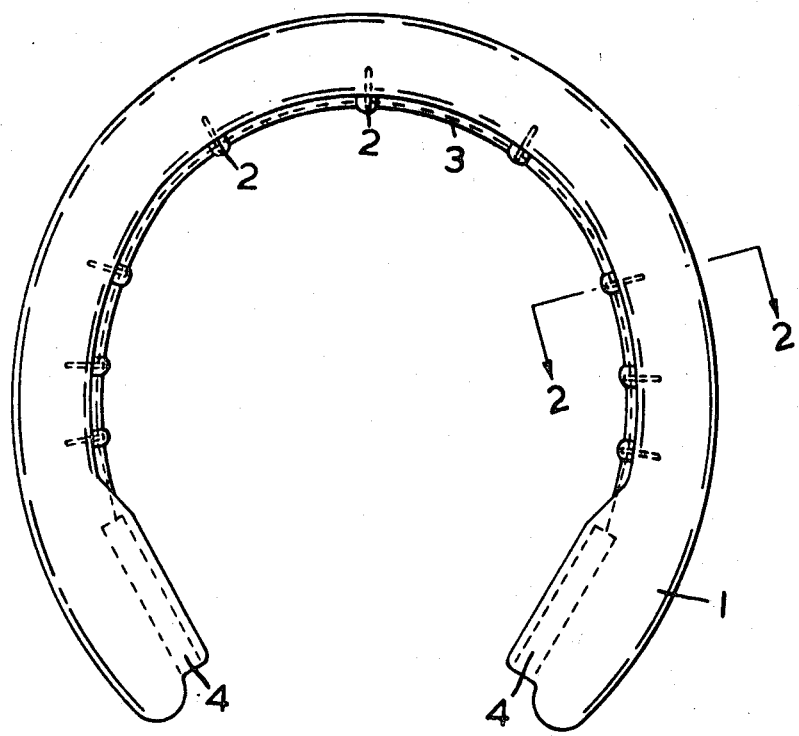
FIG. 1 is a plan view of the shoe according to one embodiment of the present invention.
Figure 2:
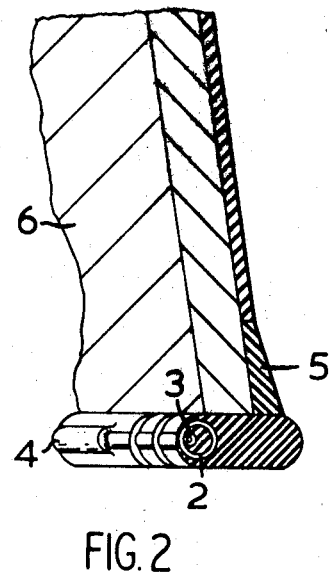
FIG. 2 is a section taken along the line 2-2 of FIG. 1.

Referring to FIGS. 1 and 2, the horseshoe 1 formed of hard rubber has a plurality of spaced eyelets 2 on the inner edge thereof through which a heavy leader wire 3 passes. The wire 3 is anchored at each end thereof to adjustment screws 4 fixedly mounted on the inner edge of the shoe 1 and adapted to releaseably shorten or lengthen the wire 3 and thus vary the distance between the ends of the shoe 1 against its natural resilience. As shown in FIGS. 1 and 2, the eyelets 2, wire 3 and screws 4 are also covered with hard rubber to make the shoe more comfortable on the horse's foot.

Figure 3:
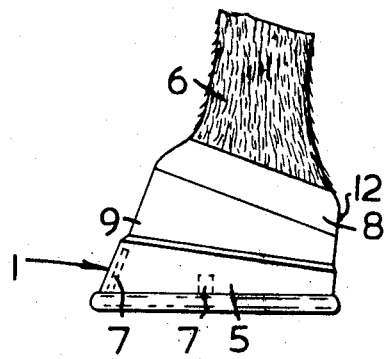
FIG. 3 is a diagrammatic representation of a shoe according to FIGS. 1 or 2 fitted on a horse's hoof.

Referring now to FIGS. 2 and 3, the shoe includes an integral upstanding lip 5 which is shaped and dimensioned to accommodate the horse's hoof 6 whereby to vary the length of the cord 3. This size of the shoe may be varied and thus be made to provide a snug fit on the hoof 6. With lip 5 and securely attached to the shoe 1 are metal clips 7 desirably three in number at the front and each side of the shoe to give the shoe added strength.

Figure 4:
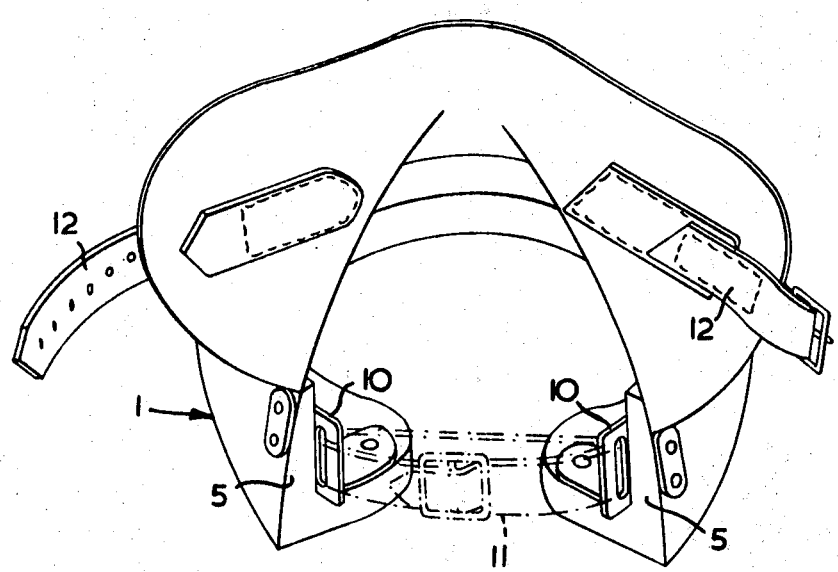
FIG. 4 is a rear perspective view of a shoe according to an alternative embodiment of the present invention.

A rubber boot 8 is also provided which fits around the pastern down to the cornet of the horse's foot 6 and fastens at the heel of the foot by means of a strap 12 (FIG. 4).

Fastened to the boot 8 is a strong elastic rubber sheath 9 which covers the remainder of the hoof 6 and is attached to the lip of the shoe. This sheath 9 has sufficient tension to keep the shoe in place and also has sufficient elasticity to allow for expansion of the hoof during its growth.

Referring now to FIG. 4 the horseshoe 1 has eyelets 10 fixedly attached to the upper surface thereof as well as the lip 5. A strap 11 passes through the eyelets 10 and is adjustable to vary the distance between the ends of the shoe 1.

I claim:

1. A reuseable generally U-shaped unitary horseshoe formed from a hard resilient natural or synthetic resinous material which may be readily fitted to and removed from a horse's hoof without the use of nails, said shoe having a lip extending from its outer edge shaped to engage the lower part of the hoof and being provided with means adapted to releaseably reduce the distance between the free ends of the shoe against the natural resilience of the shoe whereby to adjust the shape of the shoe for fitting to the horse's hoof and in combination with said shoe a boot formed from a natural or synthetic material adapted to fit around the pastern and releaseably fastened at the heel of the horse's foot and an elastic sheath extending between the lip and the boot attached to the upper edge of the lip and the lower edge of the boot formed from a natural or synthetic resinous material.

2. A shoe as claimed in claim 1 in which the means adapted to releaseably reduce the distance of the free ends of the shoe is located on an edge of the shoe.

3. A shoe as claimed in claim 2 in which the edge is the inner edge.

4. A shoe as claimed in claim 3 in which the inner edge of the shoe is provided with means defining a selected path around said inner edge; and a cord passing along said path and anchored at each end thereof and the adjustment being adapted to releaseably shorten the length of the wire.

5. A shoe as claimed in claim 3 in which the inner edge of the shoe is provided with a plurality of spaced eyelets through which a wire passes, said wire being anchored at each end to the inner edge of the shoe and adjustment means provided on the inner edge of said shoe adapted to releaseably shorten the length of said wire.

6. A shoe as claimed in claim 5 in which each end of the wire is provided with an adjustment screw attached to the inner edge of said shoe for shortening and lengthening said wire.

7. A shoe as claimed in claim 1 in which the lip has its greatest width at the front of the shoe and tapers towards the heel of the shoe.

8. A shoe as claimed in claim 1 in which metallic clips are provided on the inner surface of the lip for the strengthening of the shoe.

9. A shoe as claimed in claim 1 in which the natural or synthetic resinous material is a hard rubber.

10. A shoe as claimed in claim 1 in which the means adapted to releasably reduce the distance of the free ends of the shoe comprises a pair of eyelets each connected to a free end of said shoe and adjustable strap means passing through said eyelets and adapted to releaseably shorten the distance between said eyelets.

11. A shoe as claimed in claim 10 in which the eyelets are directly fixedly attached to said shoe.

12. A shoe as claimed in claim 10 in which said eyelets are attached to said lip.